United States Patent
Wahlqvist et al.

(10) Patent No.: US 8,929,202 B2
(45) Date of Patent: Jan. 6, 2015

(54) TECHNIQUE FOR HANDLING RADIO LINK FAILURE IN A COMMUNICATION NETWORK

(75) Inventors: Mattias Wahlqvist, Madrid (ES); Per Beming, Stockholm (SE); Magnus Lindstrom, Spanga (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 554 days.

(21) Appl. No.: 12/663,964

(22) PCT Filed: Dec. 20, 2007

(86) PCT No.: PCT/EP2007/011288
§ 371 (c)(1),
(2), (4) Date: Dec. 10, 2009

(87) PCT Pub. No.: WO2008/151658
PCT Pub. Date: Dec. 18, 2008

(65) Prior Publication Data
US 2010/0165836 A1    Jul. 1, 2010

Related U.S. Application Data

(60) Provisional application No. 60/977,779, filed on Oct. 5, 2007.

(30) Foreign Application Priority Data

Jun. 13, 2007 (SE) .................................. 0701438

(51) Int. Cl.
*H04W 36/20* (2009.01)
*H04W 76/02* (2009.01)
*H04W 24/04* (2009.01)

(52) U.S. Cl.
CPC ............ *H04W 76/028* (2013.01); *H04W 24/04* (2013.01); *H04W 76/021* (2013.01)
USPC ........... 370/225; 370/344; 370/328; 455/403; 455/405; 455/423; 455/424

(58) Field of Classification Search
USPC .......... 370/225, 344, 328; 455/405, 403, 423, 455/424; 379/126, 133
See application file for complete search history.

(56) References Cited

U.S. PATENT DOCUMENTS 6,459,695 B1 * 10/2002 Schmitt .......................... 370/344
6,981,039 B2 * 12/2005 Cerami et al. ................ 709/223

(Continued)

FOREIGN PATENT DOCUMENTS

EP     1720367 A1    11/2006

OTHER PUBLICATIONS

European Telecommunications Standards Institute, "Universal Mobile Telecommunications System (UMTS); Feasibility Study for Evolved Universal Terrestrial Radio Access (UTRA) and Universal Terrestrial Radio Access Network (UTRAN)", Technical Report, ETSI TR 125 912 V7.1.0 (3GPP TR 25.912 v. 7.1.0, Release 7), Sep. 1, 2006, p. 29, Section 9.1.

*Primary Examiner* — Jamal Javaid
(74) *Attorney, Agent, or Firm* — Coats & Bennett, PLLC

(57) ABSTRACT

A technique for handling radio link failure in a communication network (10) is provided. A method implementation of this technique comprises the steps of maintaining radio link failure information including the identifier of a user equipment (UE) effected by the radio link failure together with at least one of a time stamp of when the radio link failure was detected and a reference to a cell (C1) which was serving the user equipment (UE) before the radio link failure was detected, receiving reconnection information including an identifier of a reconnected user equipment (UE) effected by a radio link failure after the user equipment (UE) is reconnected to the communication network and correlating the radio link failure information with the reconnection information to obtain a correlation result.

21 Claims, 6 Drawing Sheets

(56) References Cited

U.S. PATENT DOCUMENTS

| | | |
|---|---|---|
| 7,136,636 B1 | 11/2006 | McLaughlin |
| 2004/0077331 A1 | 4/2004 | King |
| 2004/0152362 A1 | 8/2004 | Carter et al. |
| 2007/0291770 A1 * | 12/2007 | Kitazoe .................. 370/395.52 |

* cited by examiner

TECHNIQUE FOR HANDLING RADIO LINK FAILURE IN A COMMUNICATION NETWORK

TECHNICAL FIELD

The invention generally relates to the field of handling radio link failure in a communication network.

BACKGROUND

Radio link failure (RLF) happens in a mobile communication network when a mobile station, e.g. a mobile telephone, loses connection with the communication network in an uncontrolled manner. Radio link failures usually do not occur randomly. Typically, radio link failures occur at certain locations, or when a mobile station is moving out of the network coverage area of cell and into the network coverage area of another cell that has not been configured correctly. A reason for a connection loss may for example be that the mobile station is rapidly leaving the radio coverage area of the base station which is serving the mobile station. In such a situation, if RLF cannot be avoided, it is desired that the mobile station as soon as possible reconnects to the communication network in order to minimize the interruption time, a loss of transmission data and the perceived service degradation for the user of the mobile station For this purpose, after losing connection with the communication network, the mobile station performs a plurality of network reconnection procedures including selecting a new base station and cell and accessing the new base station in order to reconnect to the communication network.

For next generation mobile networks (NGMN) according to the Long Term Evolution (LTE) of the 3GPP (Third Generation Partnership Project) radio technology, it is proposed that a user equipment (UE) which detects that it is effected by a RLF, shall move to the LTE_IDLE state and perform a service request in order to reconnect to the network and recover the radio network bearers. The LTE_IDLE state in LTE is a power conversation state for the UE. In this state, the UE is not transmitting or receiving data packets to or from the network. In LTE_IDLE state, no context about the UE is stored in the evolved Node B (eNodeB), i.e. in the base station which is serving the UE. Therefore, the eNodeB has no information regarding the UE which is requesting to reconnect available.

In order to reconnect the UE to the communication network, it is necessary that the evolved packet core (EPC) of the communication network is involved in the reconnection process, i.e. context information regarding the UE has to be obtained by the eNodeB via the EPC. EPC is the mobile packet backbone network behind the eNodeBs. A state transition from LTE_IDLE state to LTE_IDLE active state, i.e. the state in which the UE is registered with the communication network and a Radio Resource Control (RRC) connection with the eNodeB is established, will take approximately 100 ms. Hence, such a network reconnection after RLF may take a long time and may occupy core network elements which are needed for other network tasks.

Document EP 1 720 367 A1 concerns a method of operating a user equipment. If a problem, such as loss of coverage or call has occurred, information about the location where the problem has occurred is stored in the memory of the user equipment. After successful recovery from the problem, an alternative base station is also stored in the memory. Next time the same problem is encountered at the same location, the user equipment uses the previous information for alleviating the problem or performing a fast recovery.

SUMMARY

Accordingly, there is a need for a technique for handling radio link failure in a communication network which avoids at least some of the disadvantages outlined above.

This need is satisfied according to a first aspect by a method for handling radio link failure in a communication network. The method comprises the steps of detecting a radio link failure with respect to a user equipment and logging an identifier of the user equipment effected by the radio link failure together with at least one of the data items of a time stamp of when the radio link failure was detected and a reference to a cell which was serving the user equipment before the radio link failure was detected.

The method may be executed by a base station, such as an eNodeB or any other suitable network component. In particular, this method may be executed by the base station to which the user equipment is connected when the radio link failure occurs. The user equipment may be any kind of communication terminal, e.g. a mobile telephone which is capable of communicating within the communication network.

According to a further aspect, a method for handling radio link failure in a communication network is provided, which comprises the steps of maintaining radio link failure information including an identifier of a user equipment effected by the radio link failure together with at least one of the data items of a time stamp of when the radio link failure was detected and a reference to a cell which was serving the user equipment before the radio link failure was detected, receiving reconnection information including an identifier of a reconnected user equipment effected by a radio link failure after the user equipment is reconnected to the communication network and correlating the radio link failure information with the reconnection information to obtain a correlation result. The correlation result may for example be a relation between cells having a high amount of radio link failures and cells to which mobile terminals are frequently reconnecting after a radio link failure has occurred.

This method may be executed by a base station, such as an eNodeB or any other suitable network component. In particular, this method may be executed by a base station, to which a user equipment is reconnected after a radio link failure has occurred. In case the user equipment is not leaving its serving cell, this base station may be the same base station to which the user equipment was connected before the radio link failure has occurred. The method may also be executed by a network component which is not a base station, e.g. a core network component. In this case, this network component receives the radio link failure information and the reconnection information from the base station(s) to which the user equipment was connected before the radio link failure and to which the user equipment is reconnected after the radio link failure.

The identifier may be any kind of identification information which unambiguously identifies the user equipment, e.g. a Radio Network Temporary Identity (RNTI) such as a Cell RNTI (C-RNTI), a Random Access RNTI (RA-RNTI), a Paging RNTI or a BCCH RNTI, a Temporary Mobile Subscriber Identity (TMSI) such as a Packet TMSI (P-TMSI) or a S-TMSI, or a Globally Unique Temporary Identity (GUTI). For correlating the radio link failure information with the reconnection information in order to obtain a correlation result, in many cases only the identifier of the user equipment and a time stamp of when the radio link failure was detected or a reference to a cell which was serving the user equipment before the radio link failure was detected are necessary. In other words, it may be sufficient that only the identifier of a user equipment effected by the radio link failure together with a time stamp of when the radio link failure was detected or the identifier of a user equipment effected by the radio link failure together with a reference to a cell which was serving user equipment before the radio link failure was detected are maintained. The cell reference may for example not be necessary in situations in which time stamps from different base stations of when radio link failures were detected can be correlated. In order to facilitate the correlation of the radio link failure information with the reconnection information to obtain a correlation result, both the time stamp and the cell information may be maintained together with the identifier.

The reconnection information may further include at least one of a time stamp of when the user equipment was reconnected with the communication network and a reference to a cell which is serving the user equipment after reconnection to the communication network. Similar to the maintenance of the radio link failure information, only one of a time stamp of when the user equipment was reconnected with the communication network and a reference to a cell which is serving the user equipment after reconnection to the communication network may be received together with the identifier of the reconnected user equipment. Receiving both the time stamp and the cell information may facilitate a correlation of the radio link failure information with the reconnection information in order to obtain a correlation result.

In one method implementation, the correlation result may be evaluated and based on the evaluation, cells having a high amount of radio link failures may be determined. In other words, based on the logged and received radio link failure information, it may be determined, in which cells of a communication network more radio link failures than in other cells of the communication network occur. The result of this determination may be expressed in absolute numbers or as a percentage.

According to a further aspect, the correlation result may be evaluated and based on the evaluation, cells, to which user equipments are frequently reconnecting after radio link failures have occurred, may be determined. Thereby, it is possible to determine disconnection and reconnection relationships between cells of a communication network. For example, it is possible to determine that in a cell A, a high amount (e.g. more than a predetermined threshold value per time) of radio link failures occur and in a certain percentage of the cases, the user equipment reconnects after the radio link failure to cell B. Such disconnection and reconnection relationships may be determined for all cells.

In order to minimize the interruption time of a user equipment effected by a radio link failure, user equipment context information may be sent to a base station which is serving a cell, to which user equipments are frequently reconnecting after a radio link failure has occurred. Frequently reconnecting means for example that a user equipment is reconnecting more than a predetermined number of times (or a predetermined percentage) in a predetermined time period to the cell after a radio link failure has occurred. However, the base station, to which the user equipment context information is sent, may also be determined by a network operator.

The user equipment context information may comprise data which the base station requires for communicating with user equipment. Such user equipment context information may for example be the identifier of the user equipment (e.g. for looking up further information by the base station itself, security keying material, a Radio Resource Control (RRC) context, a System Architecture Evolution (SAE) bearer context or a S1 interface context reference.

The sending of user equipment context information to a base station which is serving a cell, to which user equipments are frequently reconnecting after a radio link failure has occurred, may take place every time the user equipment is served by a cell having a high amount of radio link failure. Thereby, a security measure in the cell, to which user equipments are frequently reconnecting after a radio link failure has occurred, is provided, since the base station already has the user equipment context information available and does not have to request it after the user equipment requests network reconnection. Thereby, the network reconnection time after the occurrence of an radio link failure can be reduced.

The sending of the user equipment context information to a base station which is serving a cell, to which user equipments are frequently reconnecting after a radio link failure has occurred, may also take place after a radio link failure of the user equipment has been detected. Thereby, the time period between the detection of the radio link failure and the reconnection to the communication network may be used for providing the cell, to which user equipments are frequently reconnecting after a RLF has occurred, with the potentially required user equipment context information.

In order to facilitate future handover attempts, an interface between base stations may be set up. Thereby, the time for handover between different base stations may be reduced.

Related cells may also be defined as neighbour cells in order to facilitate future handover attempts. Such related cells may for example be cells, in which radio link failures are frequently occurring and cells, to which user equipments are frequently reconnecting after a radio link failure has occurred. The future handover attempt may be performed via the evolved packet core.

According to one aspect, handover parameters between cells having a high amount of radio link failures and cells, to which user equipments are frequently reconnecting after a radio link failure has occurred, may be adjusted. Since it is known that connection losses and reconnections in certain neighbouring cells occur frequently, network parameters may be adjusted in that the time for handovers between cells having a high amount of radio link failures and cells, to which user equipments are frequently reconnecting after a radio link failure has occurred, may be optimized. The handover parameters may for example include intra-frequency handover parameters. By adjusting the handover parameters, the number of dropped calls may even be reduced.

According to a further aspect, an X2 interface between base station serving cells having a high amount of radio link failures and cells, to which user equipments are frequently reconnected after a radio link failure has occurred, may be defined. The X2 interface may in particular support handovers of user equipments between base stations in LT_ACTIVE state.

According to a still further aspect, the deployment of a base station may be adjusted so that a cell having a high amount of radio link failures and a cell, to which user equipments are frequently reconnected after a radio link failure has occurred, are served by the same base station. By means of such an adjustment of the deployment of a base station, the time for reconnection after the occurrence of a radio link failure may be reduced, since the base station has all necessary user equipment context information available and does not have to request it when a reconnection request arrives.

According to a further aspect, a method for handling radio link failure in a communication network, whereby the steps of the method are carried out by a user equipment, is provided.

The method comprises the steps of sending an identifier of a user equipment to a first base station, detecting a radio link failure and sending the same identifier to the first base station or a second base station after a radio link failure of the user equipment has been detected and the user equipment is reconnected or reconnecting to the communication network. By means of this method, the user equipment provides the base station with all the information it or a network component requires for correlating radio link failure information with reconnection information.

According to a further aspect, the user equipment may send a reference to the cell which was serving the user equipment before a radio link failure has occurred to at least one of the first base station and the second base station. After a radio link failure has occurred, the user equipment may reconnect to the base station to which it was connected before the radio link failure has occurred or it may reconnect to another base station, for example because it has moved to the network coverage area of another cell or a network connection in the originating cell is temporarily not possible.

The invention can be practiced in the form of hardware, in the form of software and in the form of a combined hardware/software approach. As for a software aspect, a computer program product is provided. The computer program product comprises program code portions for performing one or more of the steps of the methods described above when the computer program product is run on one or more components of a network. The computer program product may be stored on a computer-readable recording medium.

As for a hardware aspect, a base station is provided. The base station comprises a detecting unit for detecting a radio link failure with respect to a user equipment and a logging unit for logging identifier of the user equipment effected by the radio link failure together with at least one of the data items of a time stamp of when the radio link failure was detected and a reference to a cell which was serving the user equipment before the radio link failure was detected. The base station may in particular be an eNodeB.

According to a further hardware aspect, a network component is provided. The network component comprises a maintaining unit for maintaining radio link failure information including the identifier of a user equipment effected by the radio link failure together with at least one of the data items of a time stamp of when the radio link failure was detected and a reference to a cell which was serving the user equipment before the radio link failure was detected, a receiving unit for receiving reconnection information including an identifier of a reconnected user equipment effected by a radio link failure after the user equipment is reconnected to the communication network and a correlating unit for correlating the radio link failure information with the reconnection information to obtain a correlation result. The network component may be a base station, an eNodeB or any other suitable network component located, for example, in the core network.

According to a further hardware aspect, a user equipment is provided. The user equipment comprises a sending unit for sending an identifier of the user equipment to a base station and a detecting unit for detecting a radio link failure, wherein the same identifier is sent to the same or another base station after a radio link failure of the user equipment has been detected and the user equipment is reconnected to a communication network.

BRIEF DESCRIPTION OF THE DRAWINGS

In the following, the invention will be described with reference to exemplary embodiments illustrated in the drawings, wherein.

DESCRIPTION OF PREFERRED EMBODIMENTS

In the following, for purposes of explanation and not limitation, specific details are set forth, such as particular sequences of steps, interfaces and configurations, in order to provide a thorough understanding of the present invention. It will be apparent to one skilled in the art that the present invention may be practiced in other embodiments that depart from the specific details.

Moreover, those skilled in the art will appreciate that the functions and processes explained herein below may be implemented using software functioning in conjunction with a programmed microprocessor or general purpose computers. It will also be appreciated that while embodiments are primarily described in the form of methods and apparatuses, the invention may also be embodied in a computer program product as well as in a system comprising a computer processor and a memory coupled to the processor, wherein the memory is encoded with one or more programs that may perform the functions disclosed herein.

In the following embodiments, various exemplary scenarios of handling radio link failure in a communication network are disclosed. These exemplary embodiments are based on a NGMN according to LTE. However, the present invention is not limited to LTE. The present invention may as well be employed in any other communication network, e.g. a network according to the Universal Mobile Telecommunications System (UMTS) standard.

Figure 1:
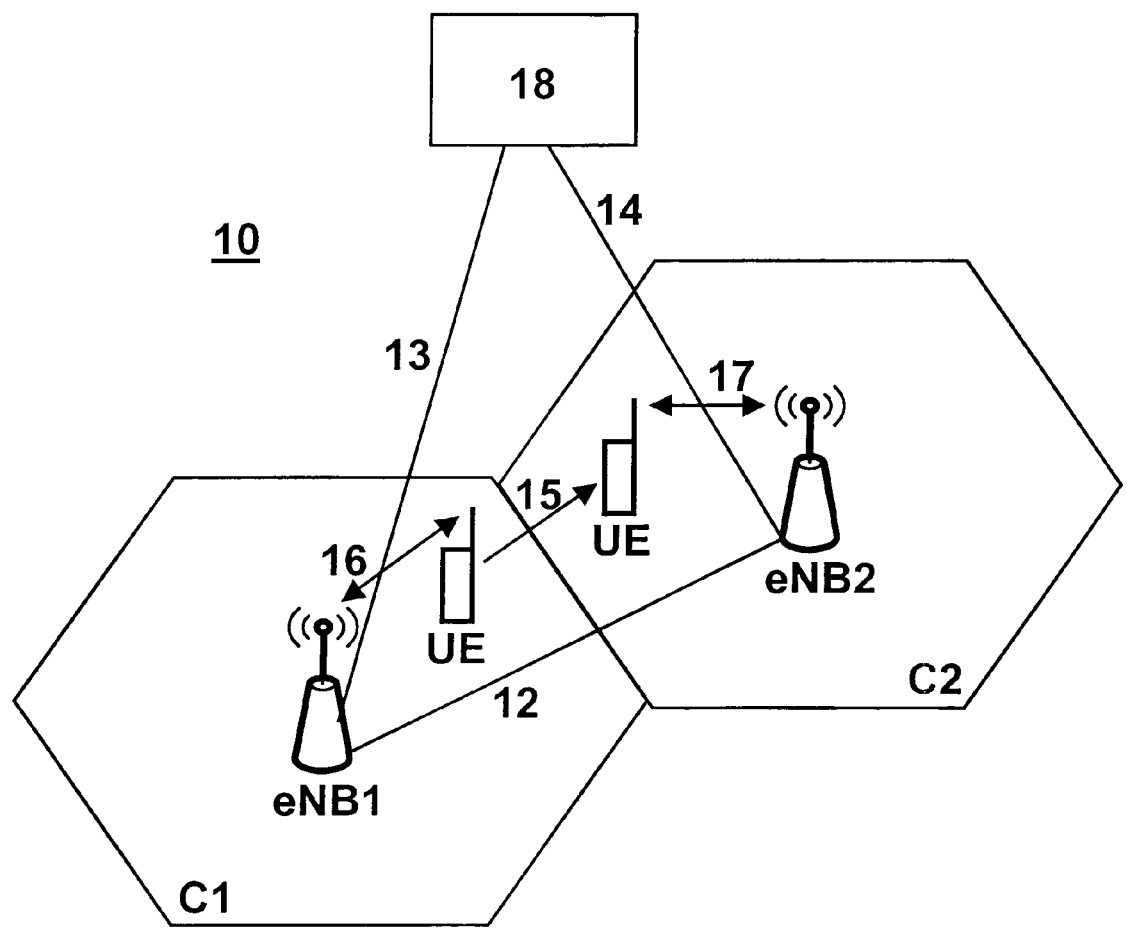
FIG. 1 is a schematic block diagram illustrating a communication network including apparatus embodiments.

FIG. 1 shows a schematic block diagram illustrating a communication network 10 including a first eNodeB eNB1 which is serving a first cell C1 and a second eNodeB eNB2 which is serving a second cell C2. The first and the second eNodeBs eNB1 and eNB2 are connected by wire or via an air interface 13, 14 with a network component 18. The network component 18 is further connected with a core network (not shown). An X2 interface 12 is provided between the first eNodeB eNB1 and the second eNodeB eNB2.

A user equipment UE is located in the cell C1 and is in communication via an air interface 16 with the first eNodeB eNB1. The user of the user equipment UE is travelling in a high speed train (not shown). During a connection of the UE with the first eNodeB eNB1, i.e. during a data transmission over the air interface 16, the high speed train with the UE is leaving cell C1 and is rapidly entering the network coverage area of cell C2, as indicated by arrow 15. Due to the rapid relocation, i.e. the rapid movement from cell C1 to cell C2, a radio link failure occurs. Accordingly, the UE is losing the connection over the air interface 16 with the first eNodeB eNB1.

After the occurrence of the radio link failure, eNB1 detects the radio link failure. The first eNodeB eNB1 logs an identifier of the UE together with at least one of a time stamp of when the radio link failure was detected and a reference to the cell C1 which was serving the UE before the radio link failure was detected. The first eNodeB eNB1 provides this logging information to the network component 18.

After the occurrence of the radio link failure, the UE is located in the network coverage area of the second eNodeB eNB2, i.e. in cell C2. Accordingly, the UE selects this cell for reconnection with the communication network 10 and tries to reconnect via an air interface 17 with the second eNodeB eNB2. The reconnection is successful. The second eNodeB eNB2 logs an identifier of the UE, optionally together with a time stamp of when the UE was connected to the second eNodeB eNB2 and a reference to the cell C2 which is serving the UE after reconnection to the communication network 10. The second eNodeB eNB2 provides this information via the connection 14 to the network component 18.

Accordingly, the network component 18 has radio link failure information from the first eNodeB eNB1 and reconnection information from the second eNodeB eNB2 available. The network component 18 may receive corresponding information from other eNodeBs (not shown) of the communication network 10. The network component 18 then correlates the radio link failure information and the reconnection information to obtain correlation results. Thereafter, it evaluates each correlation result in order to determine cells having a high amount of radio link failures and cells, to which user equipment are frequently reconnecting after a RLF has occurred. Based on this information, the network parameters between certain cells, in the present embodiment between cell C1 and cell C2, may be optimized.

In the embodiment according to FIG. 1, the network component 18 has determined based on the correlation result that radio link failures occur frequently in cell C1 and user equipments are frequently reconnecting after the occurrence of radio link failures at cell C2 to the communication network 10. Hence, the network parameters between cells C1 and C2 are optimized in that any time a UE is located in cell C1, the user equipment context information of this UE is sent from the first eNodeB in eNB1 to the second eNodeB eNB2. Since the probability is high that radio link failures occur in cell C1 and the probability is as well high that after the occurrence of a radio link failure in cell C1, the UE will be reconnecting to the second eNodeB eNB2 of cell C2, the second eNodeB eNB2 has already the user equipment context information of the UE available. Therefore, reconnection of UE to the communication network 10 is accelerated, since the second eNodeB eNB2 does not have to determine or request further reconnection information, for example from the communication network 10.

Moreover, since the user equipment context information is sent from the first eNodeB eNB1 to the second eNodeB eNB2 preferably before a radio link failures has occurred, the delay due to the detection of a radio link failure and a reconnection request can be avoided. Although not shown in FIG. 1, it is also possible that the UE after the occurrence of a radio link failure in cell C1 again reconnects to the same eNodeB, i.e. eNB1. This may for example happen in case the first eNodeB eNB1 temporarily cannot offer any services.

Figure 2:
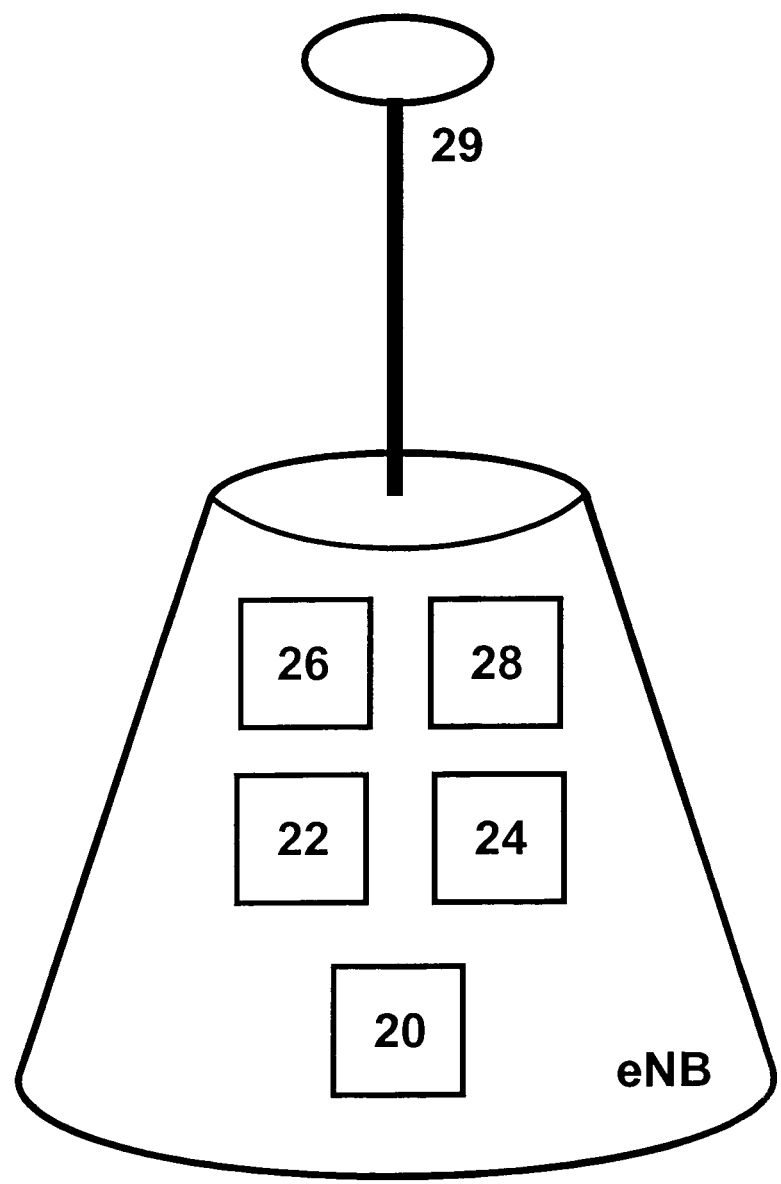
FIG. 2 is a schematic block diagram illustrating an eNodeB which may be employed in the communication network of FIG. 1.

FIG. 2 shows a schematic block diagram of an eNodeB eNB. The eNodeB may be used in the communication network 10 shown in FIG. 1. The eNodeB comprises an antenna 29 for communicating with a plurality of user equipments. Furthermore, the eNodeB eNB comprises a detecting unit 20 for detecting a radio link failure with respect to a user equipment, a logging unit 22 for logging an identifier of the user equipment effected by the radio link failure together with at least one of a time stamp of when the radio link failure was detected and a reference to a cell which was serving the user equipment before the radio link failure was detected, a maintaining unit 24 for maintaining radio link failure information including an identifier of the user equipment effected by the radio link failure together with at least one of a time stamp of when the radio link failure was detected and a reference to a cell which was serving the user equipment before the radio link failure was detected, a receiving unit 26 for receiving reconnection information including an identifier of a reconnected user equipment effected by the radio link failure after the user equipment is reconnected to the communication network and a correlating unit 28 for correlating the radio link failure information and the reconnection information to obtain a correlation result.

In this embodiment according to FIG. 2, the eNodeB eNB is receiving the radio link failure information and the reconnection information and is capable of correlating this information to obtain a correlation result. The embodiment according to FIG. 2 deviates from the embodiment according to FIG. 1, in that in the embodiment according to FIG. 1, the network component 18 is the instance for correlating the radio link failure information with the reconnection information. However, in the embodiment according to FIG. 2, the eNodeB eNB is providing this correlation. It is also possible that both the network component 18 and the eNB are providing correlation results.

Figure 3:
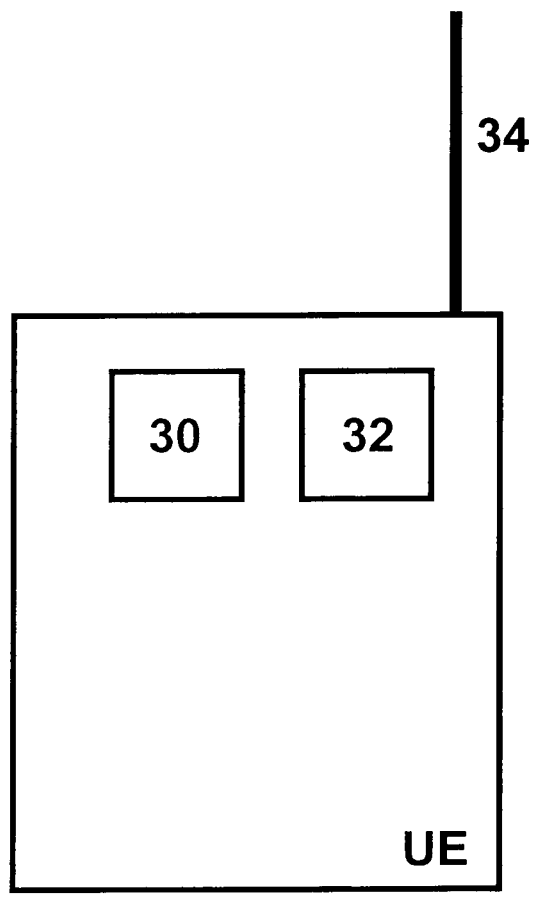
FIG. 3 is a schematic block diagram illustrating a user equipment which may be employed in the communication network of FIG. 1.

FIG. 3 shows a schematic block diagram illustrating a user equipment UE. The user equipment UE comprises an antenna 34 for communicating via an air interface with a base station, e.g. an eNodeB (not shown). Furthermore, the user equipment UE comprises a sending unit 30 for sending an identifier of the user equipment UE to a base station and a detecting unit 32 for detecting a radio link failure. The user equipment UE sends the same identifier to the same or another base station after a radio link failure of the user equipment UE has been detected and the user equipment is reconnecting or is already reconnected to a communication network.

Figure 4:
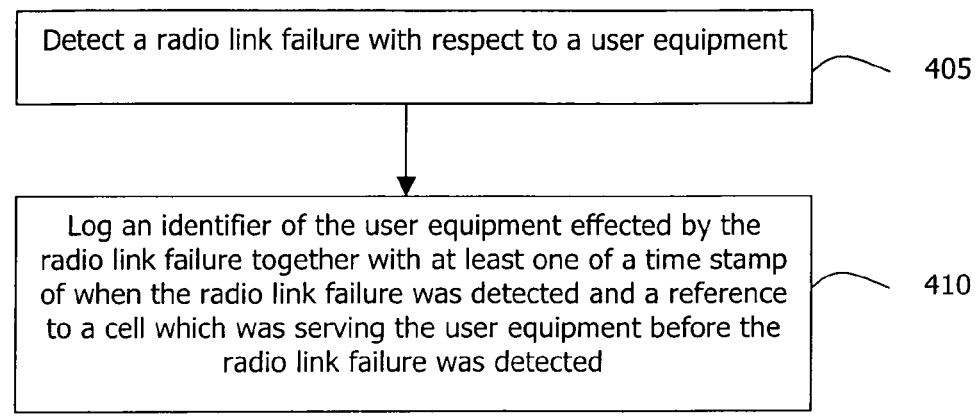
FIG. 4 is a flow chart illustrating a first method embodiment.

FIG. 4 shows a flow chart 400 of a first method embodiment of the present invention. The method embodiment relates to handling radio link failure in a communication to network and may be practiced by an eNodeB eNB1 shown in FIG. 1, an eNodeB eNB shown in FIG. 2 or by other apparatuses.

The method starts in step 405 by detecting a radio link failure with respect to a user equipment. In a next step 410, an identifier of the user equipment effected by the radio link failure together with at least one of a time stamp of when the radio link failure was detected and a reference to a cell which was serving the user equipment before the radio link failure was detected is logged.

Figure 5:
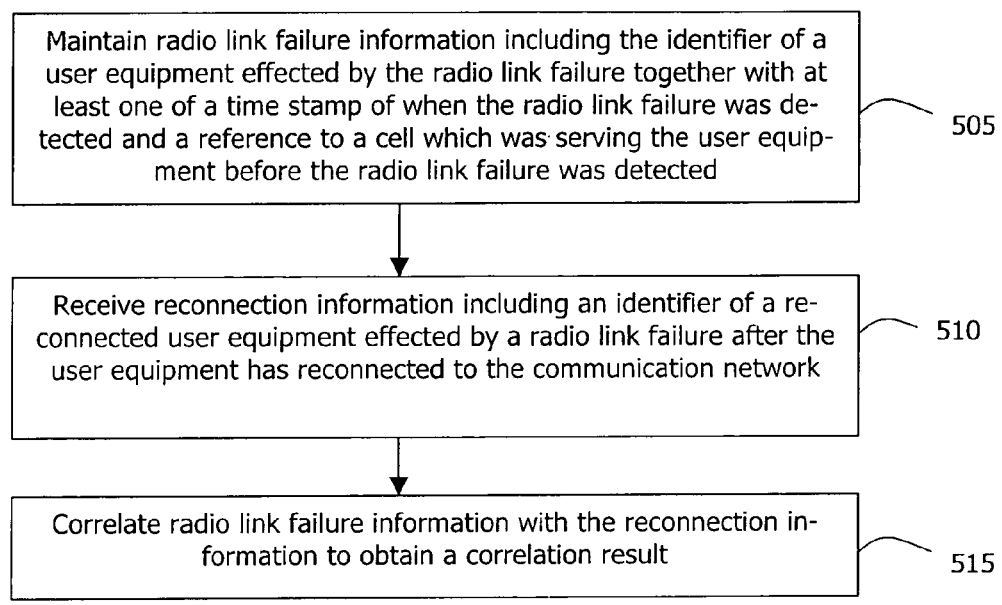
FIG. 5 is a flow chart illustrating a second method embodiment.

FIG. 5 shows a flow chart 500 of a further method embodiment. The method embodiment relates to handling radio link failure in a communication network and may be practiced by an eNodeB eNB1 shown in FIG. 1, an eNodeB eNB shown in FIG. 2 or by other apparatuses.

As shown in FIG. 5, the method starts in step 505 by maintaining radio link failure information including the identifier of a user equipment effected by a radio link failure together with at least one of a time stamp of when the radio link failure was detected and a reference to a cell which was serving the user equipment before the radio link failure was detected. As a next step 510, reconnection information including an identifier of a reconnected user equipment effected by a radio link failure after the user equipment is reconnected to the communication network is received. Thereafter, as indicated by method step 515, the radio link failure information is correlated with the reconnection information to obtain a correlation result.

Figure 6:
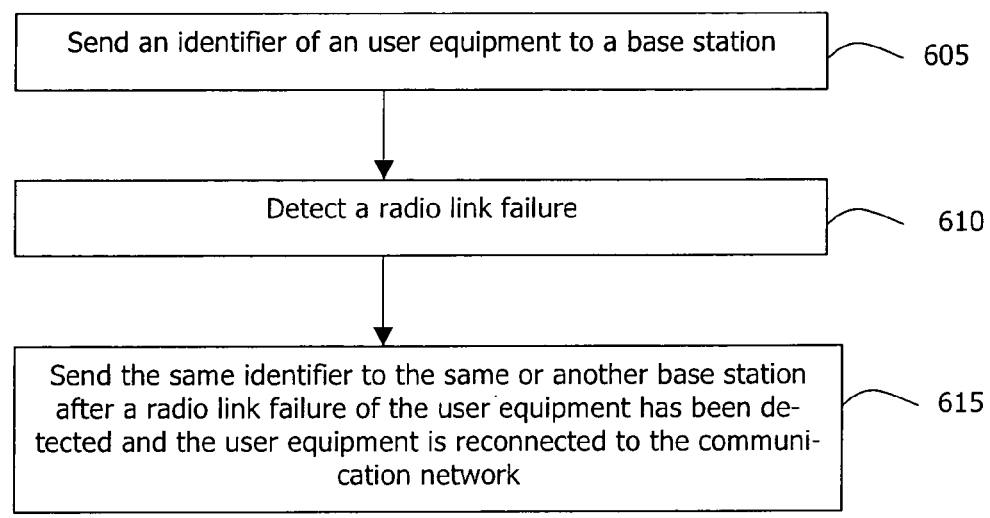
FIG. 6 is a flow chart illustrating a third method embodiment.

FIG. 6 shows a flow chart 600 of a further method embodiment. The method embodiment relates to handling radio link failure in a communication network and may be practiced by a user equipment UE shown in FIG. 1 or FIG. 3 or by other apparatuses.

The method starts in step 605 by sending an identifier of the user equipment to a base station. This sending of the identifier to the base station may occur during normal operation, i.e. during normal communication of the user equipment with the base station. Thereafter, in step 610, a radio link failure is detected by the user equipment. In a next step 615, the same identifier is sent to the same or another base station after a radio link failure of user equipment has been detected and the user equipment is reconnected to the communication network. The identifier is sent to the same base station in case the user equipment is still located in the network coverage area of this base station. However, if the user equipment has moved to the network coverage area of another base station, i.e. another cell, the user equipment sends the same identifier to this base station.

As has become apparent from the above embodiments, the present technique for handling radio link failure in a communication network provides the advantage that the interruption time period after a radio link failure has occurred can be minimized. Thereby, data loss during interruption time can be minimized or avoided and a service degradation perceived by the user of a user equipment can be reduced. The network parameters of the communication network may be optimised in such a way that the user of a user equipment does not recognize a call drop due to radio link failure.

Although embodiments of the present invention have been illustrated in the accompanying drawings and described in the description, it will be understood that the invention is not limited to the embodiments disclosed herein. In particular, the invention is capable of numerous rearrangements, modifications and substitutions without departing from the scope of the invention as set forth and defined by the following claims.

The invention claimed is:

1. A method implemented in a network component for handling radio link failure in a communication network, comprising:
    maintaining, in a maintaining unit, radio link failure information including an identifier of a user equipment affected by the radio link failure together with at least one of a time stamp of when the radio link failure was detected and a reference to a cell which was serving the user equipment before the radio link failure was detected;
    receiving, in a receiver of the network component, reconnection information including an identifier of a reconnected user equipment affected by a radio link failure, after the user equipment is reconnected to the communication network;
    correlating, in a correlating unit, the radio link failure information with the reconnection information to obtain a correlation result;
    evaluating, in the correlating unit, the correlation result; and
    determining, in the correlating unit and based on the evaluation, one or more reconnection cells, wherein each reconnection cell comprises a cell frequently used by one or more user equipments for reconnection the communication network after radio link failures have occurred.

2. The method of claim 1 wherein the reconnection information further includes at least one of a time stamp of when the user equipment was reconnected with the communication network and a reference to the reconnection serving the user equipment after reconnection to the communication network.

3. The method of claim 1, further comprising:
    determining, based on the evaluation, cells having a high amount of radio link failures.

4. The method of claim 1, further comprising:
    setting up an interface between base stations in order to facilitate future handover attempts.

5. The method of claim 1, further comprising:
    defining related cells as neighbor cells in order to facilitate future handover attempts.

6. The method of claim 5, wherein the future handover attempts are performed via an evolved packet core.

7. The method of claim 1 wherein correlating the radio link failure information with the reconnection information comprises determining a strength of a relationship between the radio link failure information and the reconnection information to obtain the correlation result.

8. A method implemented in a base station for handling radio link failure in a communication network, the method comprising:
    detecting, in a detecting unit of the base station, a radio link failure with respect to a user equipment;
    logging, in a logging unit of the base station, an identifier of the user equipment affected by the radio link failure together with at least one of a time stamp of when the radio link failure was detected and a reference to a cell serving the user equipment before the radio link failure was detected;
    determining, in a determining unit, one or more reconnection cells from a network component in the communication network, each reconnection cell comprising a cell frequently used by one or more user equipments for reconnection to the communication network after radio link failures have occurred; and
    performing at least one of the following:
    sending user equipment context information to a base station serving at least one of the reconnection cells;
    adjusting handover parameters between cells having a high amount of radio link failures and one or more of the reconnection cells;
    defining an X2 interface between base stations serving the cells having a high amount of radio link failures and one or more of the reconnection cells;
    adjusting a deployment of a base station so that a cell having a high amount of radio link failures and at least one of the reconnection cells are served by the same base station.

9. The method of claim 8, wherein the base stations are eNodeBs.

10. The method of claim 8, wherein the user equipment context information comprises data which the base station requires for communicating with the user equipment.

11. The method of claim 8, wherein said step of sending takes place every time the user equipment is served by a cell having a high amount of radio link failures.

12. The method of claim 8, wherein said step of sending takes place after a radio link failure of the user equipment has been detected.

13. The method of claim 8, wherein said step of sending comprises sending the user equipment context information for the user equipment affected by the radio link failure.

14. A base station comprising:
a processor;
a memory coupled to the processor and encoded with one or more programs, wherein the processor is configured to;
detect a radio link failure in a communication network with respect to a user equipment; and
log an identifier of the user equipment affected by the radio link failure together with at least one of a time stamp of when the radio link failure was detected and a reference to a cell serving the user equipment before the radio link failure was detected;
determine one or more reconnection cells from a network component in the communication network, each reconnection cell comprising a cell frequently used by one or more user equipments for reconnection to the communication network after radio link failures have occurred; and
send user equipment context information to a base station serving at least one of the reconnection cells after radio link failures have occurred.

15. The base station of claim 14, wherein the base station is an eNodeB.

16. The base station of claim 14, wherein the sending unit is configured for sending the user equipment context information for the user equipment affected by the radio link failure.

17. A network component comprising:
a processor;
a memory coupled to the processor and encoded with one or more programs, wherein the processor is configured to;
maintain radio link failure information including the identifier of a user equipment affected by the radio link failure together with at least one of a time stamp of when the radio link failure was detected and a reference to a cell which was serving the user equipment before the radio link failure was detected;
a receiving unit for receiving receive reconnection information including an identifier of a reconnected user equipment affected by a radio link failure after the user equipment is reconnected to the communication network; and
correlate the radio link failure information with the reconnection information to obtain a correlation result, the correlating unit further for evaluating the correlation result and determining, based on the evaluation, one or more reconnection cells, wherein each reconnection cell comprises a cell frequently used by one or more user equipments for reconnection the communication network after radio link failures have occurred.

18. The network component of claim 17, wherein the network component is an eNodeB.

19. The network component of claim 17 wherein the correlating unit correlates the radio link failure information with the reconnection information by determining a strength of a relationship between the radio link failure information and the reconnection information to obtain the correlation result.

20. A method implemented in a component of a wireless communication network of correlating radio link failures in with subsequent reconnections, said method comprising:
detecting, in a detecting unit of the component, occurrences of radio link failures for user equipments operating in one or more cells of the communication network and recording corresponding radio link failure information for each such occurrence, including an identification of the user equipment affected by the radio link failure; and
correlating, in a correlating unit of the component, the radio link failure information with reconnection information determined for reconnecting user equipments, and determining from said correlating which cell or cells are frequently used for reconnecting to the communication network, said reconnection information comprising, for a given reconnecting user equipment, an identifier of the reconnecting user equipment.

21. The method of claim 20 wherein correlating the radio link failure information with the reconnection information comprises determining a strength of a relationship between the radio link failure information and the reconnection information to obtain the correlation result.

* * * * *